(12) United States Patent
Demuth et al.

(10) Patent No.: US 7,721,257 B2
(45) Date of Patent: May 18, 2010

(54) METHOD FOR EFFECTING SOFTWARE MAINTENANCE IN A SOFTWARE SYSTEM LANDSCAPE AND COMPUTER SYSTEM

(75) Inventors: Michael Demuth, Rauenberg (DE); Volker Schulz, Heppenheim (DE); Herbert Stegmuller, Bruchsal (DE)

(73) Assignee: SAP AG, Walldorf (DE)

( * ) Notice: Subject to any disclaimer, the term of this patent is extended or adjusted under 35 U.S.C. 154(b) by 1038 days.

(21) Appl. No.: 11/262,543

(22) Filed: Oct. 27, 2005

(65) Prior Publication Data

US 2006/0117311 A1 Jun. 1, 2006

(30) Foreign Application Priority Data

Oct. 27, 2004 (EP) .................... 04025506

(51) Int. Cl.
G06F 9/44 (2006.01)
(52) U.S. Cl. .................. 717/120; 717/172; 717/177
(58) Field of Classification Search ......... 717/120–123, 717/168–178; 713/201, 167, 121
See application file for complete search history.

(56) References Cited

U.S. PATENT DOCUMENTS

| | | | | |
|---|---|---|---|---|
| 5,237,688 A | * | 8/1993 | Calvert et al. | ........... 717/121 |
| 5,495,610 A | | 2/1996 | Shing et al. | |
| 5,608,721 A | | 3/1997 | Natarajan et al. | |
| 5,745,767 A | | 4/1998 | Rosen et al. | |
| 5,845,090 A | | 12/1998 | Collins, III et al. | |
| 5,859,977 A | | 1/1999 | Nishiyama et al. | |
| 5,860,007 A | * | 1/1999 | Soni et al. | ........... 717/121 |
| 5,953,533 A | * | 9/1999 | Fink et al. | ........... 717/175 |

(Continued)

FOREIGN PATENT DOCUMENTS

JP 2001265603 9/2001

(Continued)

OTHER PUBLICATIONS

Bawtree, Hugh, "A tool for managing change; Software Development", XP-002321302, (Aug. 2000),18 pgs.

(Continued)

Primary Examiner—Lewis A Bullock, Jr.
Assistant Examiner—Carina Yun
(74) Attorney, Agent, or Firm—Schwegman, Lundberg & Woessner, P.A.

(57) ABSTRACT

A method for effecting software maintenance in a software system landscape comprising a central control system and a plurality of logical systems interconnected by logical transport paths, each system having associated therewith one of a plurality of system roles is described. The method comprises: providing system role types, each system role type comprising a group of system roles; providing an association of tasks to system role types; providing a transport track that defines a route for software services through a group of systems in a particular order and specifies one source system in which software services are permitted, adjacent interconnected systems, and at least one target system, each software service relating to at least one of the code and the data of at least one system in the landscape; and generating a maintenance instance from the system role types, the association and the transport tracks, the maintenance instance defining tasks for effecting a software service in a maintenance interval.

12 Claims, 5 Drawing Sheets

U.S. PATENT DOCUMENTS

| | | | |
|---|---|---|---|
| 6,110,228 | A | 8/2000 | Albright et al. |
| 6,263,358 | B1 | 7/2001 | Lee et al. |
| 6,308,173 | B1 | 10/2001 | Glasser et al. |
| 6,513,132 | B1 | 1/2003 | Suzuki |
| 7,020,690 | B1 | 3/2006 | Haitsuka et al. |
| 7,107,331 | B2 | 9/2006 | Gava et al. |
| 2001/0052074 | A1* | 12/2001 | Pensak et al. ............... 713/167 |
| 2002/0026592 | A1* | 2/2002 | Gavrila et al. ............... 713/201 |
| 2002/0103851 | A1 | 8/2002 | Kikinis |
| 2002/0129356 | A1 | 9/2002 | Hellerstein et al. |
| 2002/0156798 | A1 | 10/2002 | Larue et al. |
| 2002/0169878 | A1 | 11/2002 | Orenshteyn |
| 2002/0174164 | A1 | 11/2002 | Hayashi |
| 2002/0184398 | A1 | 12/2002 | Orenshteyn |
| 2002/0198725 | A1 | 12/2002 | Piepenbrink et al. |
| 2003/0040974 | A1 | 2/2003 | Chauvin et al. |
| 2003/0084350 | A1 | 5/2003 | Eibach et al. |
| 2003/0093516 | A1 | 5/2003 | Parsons et al. |
| 2003/0142627 | A1 | 7/2003 | Chiu et al. |
| 2004/0010708 | A1 | 1/2004 | Johnson et al. |
| 2004/0060044 | A1 | 3/2004 | Das et al. |
| 2004/0081183 | A1 | 4/2004 | Monza et al. |
| 2004/0117795 | A1 | 6/2004 | Wang et al. |
| 2004/0267935 | A1 | 12/2004 | Patiejunas |
| 2005/0080888 | A1 | 4/2005 | Walter |
| 2005/0209732 | A1 | 9/2005 | Audimoolam et al. |
| 2005/0210501 | A1 | 9/2005 | Zigmond et al. |
| 2006/0112189 | A1 | 5/2006 | Demuth et al. |
| 2006/0123392 | A1 | 6/2006 | Demuth et al. |
| 2006/0123407 | A1 | 6/2006 | Demuth et al. |
| 2006/0143614 | A1 | 6/2006 | Lier et al. |
| 2006/0149813 | A1 | 7/2006 | Janik |
| 2006/0155832 | A1 | 7/2006 | Demuth et al. |
| 2006/0164257 | A1 | 7/2006 | Giubbini |
| 2006/0203812 | A1 | 9/2006 | Demuth et al. |
| 2007/0038610 | A1 | 2/2007 | Omoigui |
| 2008/0183840 | A1 | 7/2008 | Khedouri et al. |

FOREIGN PATENT DOCUMENTS

| | | |
|---|---|---|
| WO | WO-01/63482 | 8/2001 |
| WO | WO-03060718 A1 | 7/2003 |

OTHER PUBLICATIONS

Dabrowski, C , et al., "Understanding self healing in service discovery systems", XP-002323534, 6 pgs.

Hodgson, Alan , "Intel eBusiness Engineering Release Management and Application Landing", XP-002321303 *Intel Technology Journal, Q4*, (2000),1-9.

IBM Document Center, "Publication information", XP-2325608, (Observed Apr. 21, 2005),1 pg.

Szallies, Constantin , "On Using the Observer Design Pattern", XP-002323533, (Aug. 21, 1997),9 pgs.

"U.S. Appl. No. 11/261,816, Response filed Mar. 18, 2009 to Non-Final Office Action mailed Dec. 30, 2008", 15 pgs.

"U.S. Appl. No. 11/261,816, Non-Final Office Action mailed Dec. 30, 2008", 14 pgs.

"U.S. Appl. No. 11/262,343, Non-Final Office Action mailed Nov. 28, 2008", 16 pgs.

"U.S. Appl. No. 11/262,343, Response filed Jan. 30, 2009 to Non-Final Office Action mailed Nov. 28, 2008", 13 pgs.

"U.S. Appl. No. 11/262,442, Non-Final Office Action mailed Jan. 7, 2009", 16 pgs.

IBM Corporation, *Tivoli software distribution users guide 4.1*, (636 pages) XP-002321301.

IBM Corporation, *IBM Tivoli Configuration Manager—User's Guide for Software Distribution—Version 4.2*, XP-2325607, (Oct. 2002), 1-358.

McFarland Metzger, Sue S, "SAP R/3 change and transport management : the official SAP guide / (SAP R/3—Systemlandschaft Implementieren und warten)", XP-002325774, (Jan. 12, 2000), 419, 461, 465.

Schneider-Neureither, Andreas (ED), "SAP System Landscape Optimization", *SAP Press*, 2004, ISBN 1-59229-026-4, (2004), 73-78; 96-100.

"U.S. Appl. No. 11/261,816, Advisory Action mailed Jul. 28, 2009", 3 pgs.

"U.S. Appl. No. 11/261,816, Final Office Action mailed May 14, 2009", 11 pgs.

"U.S. Appl. No. 11/261,816, Notice of Allowance mailed Sep. 28, 2009", 11 Pgs.

"U.S. Appl. No. 11/261,816, Response filed Aug. 11, 2009 to Advisory Action mailed Jul. 28, 2009", 11 pgs.

"U.S. Appl. No. 11/261,816, Response filed Jul. 10, 2009 to Final Office Action mailed May 14, 2009", 12 pgs.

"U.S. Appl. No. 11/262,043, Non-Final Office Action mailed Oct. 27, 2009", 11 Pgs.

"U.S. Appl. No. 11/262,143, Non-Final Office Action mailed Oct. 8, 2009", 10 pgs.

"U.S. Appl. No. 11/262,343, Advisory Action mailed Jun. 30, 2009", 5 pgs.

"U.S. Appl. No. 11/262,343, Final Office Action mailed Apr. 27, 2009", 11 pgs.

"U.S. Appl. No. 11/262,343, Non-Final Office Action mailed Sep. 14, 2009", 16 Pgs.

"U.S. Appl. No. 11/262,343, Response filed Jun. 15, 2009 to Final Office Action mailed Arp. 27, 2009", 12 pgs.

"U.S. Appl. No. 11/262,442, Non-Final Office Action mailed Aug. 31, 2009", 18 pgs.

"U.S. Appl. No. 11/262,442, Response filed Apr. 27, 2009 to Non Final Office Action mailed Jan. 7, 2009", 17 pgs.

* cited by examiner

METHOD FOR EFFECTING SOFTWARE MAINTENANCE IN A SOFTWARE SYSTEM LANDSCAPE AND COMPUTER SYSTEM

CLAIM OF PRIORITY

The present patent application claims the priority benefit of the filing date of European Application (EPO) No. 04 025 506.9 filed Oct. 27, 2004, which is incorporated herein by reference.

TECHNICAL FIELD

This application relates generally to servicing of a software system landscape, and more particularly to a method for effecting software maintenance in a software system landscape and to a computer system.

BACKGROUND

Complex software like applicant's SAP R/3 Release 4.5 (SAP) requires customization, e.g. selection of predefined functionality, and adaptation, e.g. addition of or amendment to functionality, as well as other servicing like program and data updates, cf. "SAP System Landscape Optimization" by A. Schneider-Neureither (Ed.), SAP Press, 2004, ISBN 1-59229-026-4, and "SAP R/3 Änderungs-und Transportmanagement" by Metzger and Röhrs, Galileo Press GmbH, Bonn, Germany, $4^{th}$ reprint 2004, ISBN 3-934358-42-X.

Before such servicing may be performed, however, it has to be assured that the customizations, adaptations, program and data updates etc. are free of errors and integrate flawlessly into the software and data environment. In a factory for instance servicing errors are bound to result in costly workflow disruptions due to software malfunction or data corruption. Apart from the servicing side, other use of the software like training of new or inexperienced users may also result in a disruption of the productive system.

Such complex software may therefore be implemented in form of separate logical systems that together form a system landscape. A typical implementation of the aforementioned SAP software for instance may, cf. FIG. 1, comprise a development system 101 for customizing and development work, a quality assurance system 102 for testing functionality using representative test data, a training system 103 for training new users, and several productive systems 104, e.g. each for a different factory, for actual productive use. Other or additional users and systems may be defined according to the particular requirements.

The logical systems are identical in large parts, function autonomously and may be run on a single computer. The quality assurance system 102 for example resembles the productive system 104 in that it provides all the functionality, its present data and additionally special test data. New customization settings or adaptations may thus be thoroughly tested in the quality assurance system 102 without jeopardizing the productive system 104. Likewise, the training system 103 resembles the productive system 104 in that it provides some of the functionality and special test data. A new user using the training system 103 may thus become accustomed to the functionality and observe the effect of his actions, albeit without disturbing the productive system 104.

A transport management system connects the logical systems and serves to forward software services between systems of the system landscape via logical transport paths 105. A service may for example be approved in the development system 101 for export. It will then be forwarded to an input buffer of the quality assurance system 102. Import into the quality assurance system 102 is approved manually by an operator. Once the service has been imported into the quality assurance system 102, it will automatically be forwarded to an import buffer of the training system 103 and the productive systems 104 where it will be imported following manual approval by an operator.

The operator is in charge of manually effecting the servicing. This requires an analysis of the system landscape layout, of the route that each service takes through the system landscape, project status switches in each system that define the respective system's changeability options, attributes in each service that define properties of the service etc. Import of services and other tasks are performed based on this analysis.

This process is time consuming and bears the risk of errors. For example, care has to be taken to import services into a system in the correct order as illustrated by FIG. 2a and FIG. 2b. An original version 201 of the software and data is first modified by a first service 202, resulting in modified version 203, and subsequently by a second service 204, resulting in modified version 205, cf. FIG. 2a. However, if the second service 204 is imported before the first service 202, the original version 201 is changed into modified version 206 by the second service 204 and subsequently into modified version 207 by the first service 202, cf. FIG. 2b. The modified versions 205 and 207 differ and the version 207 will not perform as intended.

In view of the fact that an SAP R/3 implementation may comprise dozens of systems and require thousands of services per month during phases of change, the operator time required becomes considerable as does the risk for errors to occur.

SUMMARY

In one aspect of the invention, a method is provided for effecting software maintenance in a software system landscape comprising a central control system and a plurality of logical systems interconnected by logical transport paths, each system having associated therewith one of a plurality of system roles, the method comprising the steps of: providing system role types, each system role type comprising a group of system roles; providing an association of tasks to system role types; providing a transport track that defines a route for software services through a group of systems in a particular order and specifies one source system in which software services are permitted, adjacent interconnected systems, and at least one target system, each software service relating to at least one of the code and the data of at least one system in the landscape; and generating a maintenance instance from the system role types, the association and the transport tracks, the maintenance instance defining tasks for effecting a software service in a maintenance interval.

In a further aspect of the invention, a computer system is provided comprising a central control system; a plurality of logical systems, each logical system having associated therewith one of a plurality of system roles; logical transport paths that interconnect the logical systems to form a software system landscape; a transport track that defines a route for software services through a group of systems in a particular order and specifies one source system in which software services are permitted, adjacent interconnected systems, and at least one target system, each software service relating to at least one of the code and the data of at least one system in the landscape; system role types, each system role being of a system role type; an association of tasks to system role types; and a maintenance instance generated from the system role types, the association and the transport tracks, the maintenance instance defining tasks for effecting a software service in a maintenance interval.

In a still further aspect of the invention, a computer program product is provided, the computer program product comprising on a storage medium a computer code that upon execution on a computer system performs the method according to the invention.

Example embodiments of the invention thus provide for an automated generation of a maintenance instance with all tasks that are required for regular maintenance. Such a regular maintenance is performed at predefined time intervals during which software services are collected and then effected together. The complexity of the task is considerably reduced as the operator merely needs to approve automatically generated tasks.

BRIEF DESCRIPTION OF THE DRAWINGS

Further embodiments of the invention are inferable from the following description and the claims.

Figure 3:
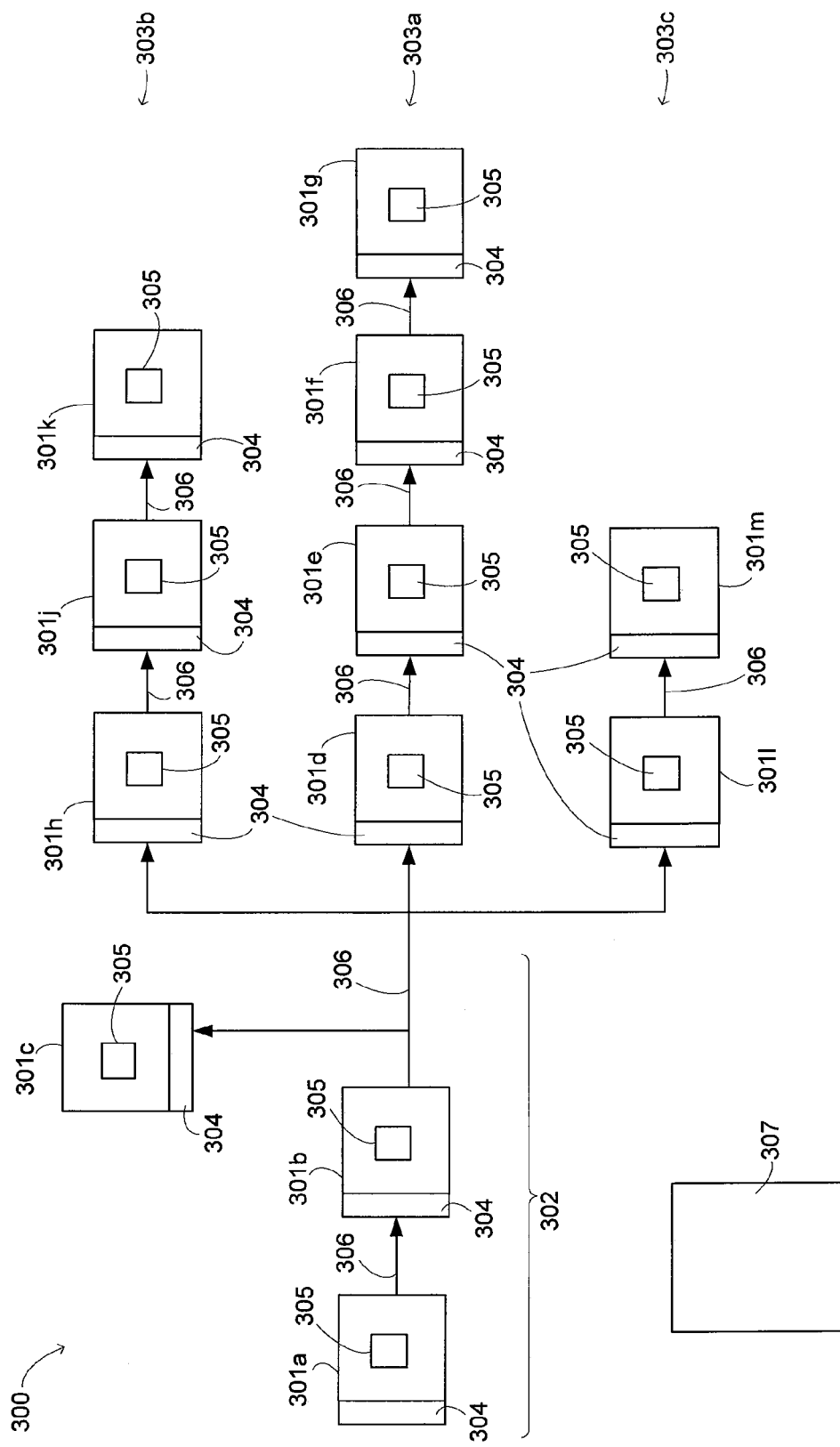
FIG. 3 illustrates a system landscape according to an example embodiment of the invention.

The embodiment shown in FIG. 3 illustrates an SAP R/3 Release 4.5 system landscape 300 with separate logical systems 301 that are here divided into a global part 302, e.g. at a main development and production facility, and local parts 303a, 303b, 303c, e.g. at other production facilities.

DETAILED DESCRIPTION

The global part 302 comprises at least a development system 301a for customizing and development work, a quality assurance system 301b for testing functionality using representative test data, and a productive system 301c for actual productive use.

The local part 303a comprises a development system 301d for customizing and development work of local adaptations to SAP, e.g. to meet different legal requirements if part 303a is located in a different country than the global part 302. The local part 303a further comprises a quality assurance system 301e for testing functionality using representative test data, a training system 301f for training new users, and a productive system 301g for actual productive use.

The local part 303b comprises a development system 301h, a quality assurance system 301j and a productive system 301k, but no training system. The local part 303c is a two system landscape comprising a development system 301l and a productive system 301m only.

The system landscape may be different according to the actual requirements. Fewer or more, different or differently connected or grouped systems 301 may be defined as needed.

The logical systems 301 are identical in large parts and function autonomously. The quality assurance system 301j for example resembles the productive system 301k in that it provides all the functionality, its present data and additionally special test data. New customization settings or adaptations may thus be thoroughly tested in the quality assurance system 301j without jeopardizing the productive system 301k.

Each system 301 comprises an import buffer 304 for buffering incoming software services and means 305 for communication with a central system 307. A transport management system connects the logical systems 301 and serves to route software services across the system landscape via logical directional transport paths 306. A service may for example relate to customization of a system 301, e.g. a selection of predefined functionality in the system 301, or an adaptation of a system 301, e.g. an addition of or amendment to functionality, or to program and data updates or the like. Transport tracks are provided that each define one or more particular routes for software services along the transport paths through the system landscape. A transport track may for example define the route from system 301a through systems 301b, 301h, 301j to system 301k. Another transport track may define the route from system 301d through systems 301e, 301f to system 301g. Transport tracks with branches may also be provided, e.g. from system 301a to system 301b and then in a first branch to system 301c and in a second branch to systems 301l, 301m. There may be more than one transport track per system landscape, each transport track being assigned to a project context like a development project for the local part 303a only or a documentation project for the global part 302 only etc.

The systems 301 of each part 302, 303a, 303b, 303c and the central system 307 may be located and simultaneously executed in a single computer, but are distributed across separate hardware. Preferably, the global part 302 and the local parts 303a, 303b, 303c each run on physically separate computer systems, which themselves may comprise different computers.

Figure 4:
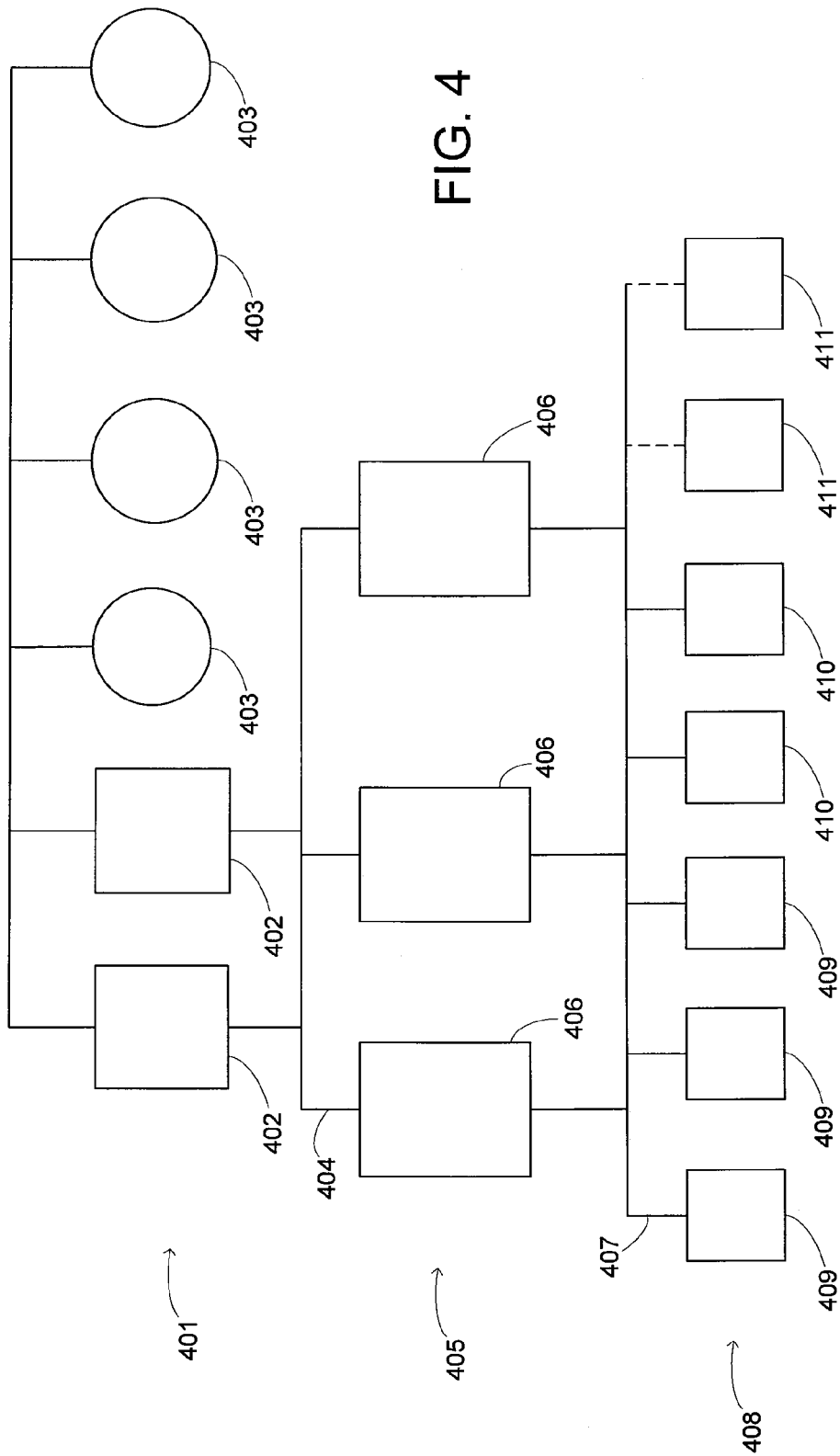
FIG. 4 shows an example embodiment of the hardware of a computer system according to an example embodiment of the invention.

An example implementation of the local part 303a may comprise, cf. FIG. 4, a data base layer 401 for storing and retrieving business data like a factory inventory, employee data, sales figures etc. The data base layer 401 comprises one or more data base servers 402 and four data bases 403, one for each of the systems 301d, 301e, 301f and 301g.

Connected to the data base layer 401 by a suitable network 404, e.g. a LAN, is an application layer 405 for execution of the software of the systems 301d, 301e, 301f and 301g. The application layer 405 comprises one or more application servers 406.

Finally, connected to the application layer 405 by a suitable network 407, e.g. a LAN, is a presentation layer 408 for the graphical user interface (GUI). The presentation layer 408 may comprise dumb terminals 409, Personal Computers 410 and/or wireless access devices 411 like PDAs.

Each system 301 has associated therewith a system role which defines the respective system's function within the landscape. The system 301a, 301b and 301c for example, have the roles "development system in the global part", "quality assurance system in the global part" and "productive system in the global part", respectively. The systems 301l and 301m have the roles "development system in the local part 303c" and "productive system in the local part 303c", respectively. The other systems 301 have corresponding roles. In SAP, the system roles are typically defined in the Solution Manager for Implementation.

According to an example embodiment of the invention, system role types are provided. System role types may comprise the following:

D Source systems: Transport requests comprising a software service are generated in a system of this type, usually a development system.

O Follow-on system: A transport request is imported into a system of this type and forwarded to at least one other system.

P Target system: A transport request is imported into a system of this type but not forwarded. Target systems are typically productive systems.

R Postprocessing system: If the landscape comprises both a development and a maintenance system, any maintenance request must be fed back to the development system. This is not usually possible with a transport request because the objects in the maintenance system have a different status than the objects in the development system. A special manual procedure is required instead.

In the embodiment of FIG. 3 the development systems 301*a*, 301*h*, 301*d* and 301*l* are of system role type D, the productive systems 301*c*, 301*k*, 301*g* and 301*m* are of system role type P and the systems 301*b*, 301*j*, 301*e* and 301*f* between the development systems and the productive systems are of the system role type O. Other and/or additional system types may be provided.

Figure 1:
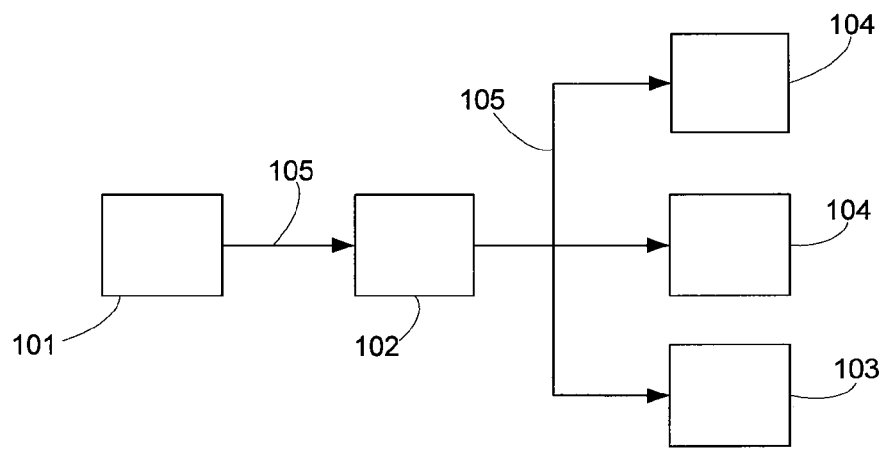
FIG. 1 shows a system landscape of the prior art.
Figure 2:
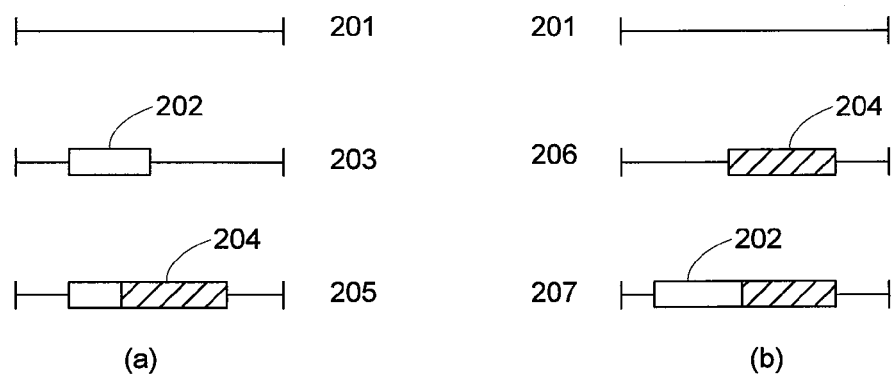
FIGS. 2a and 2b illustrate services performed in different orders according to the prior art.
Figure 5:
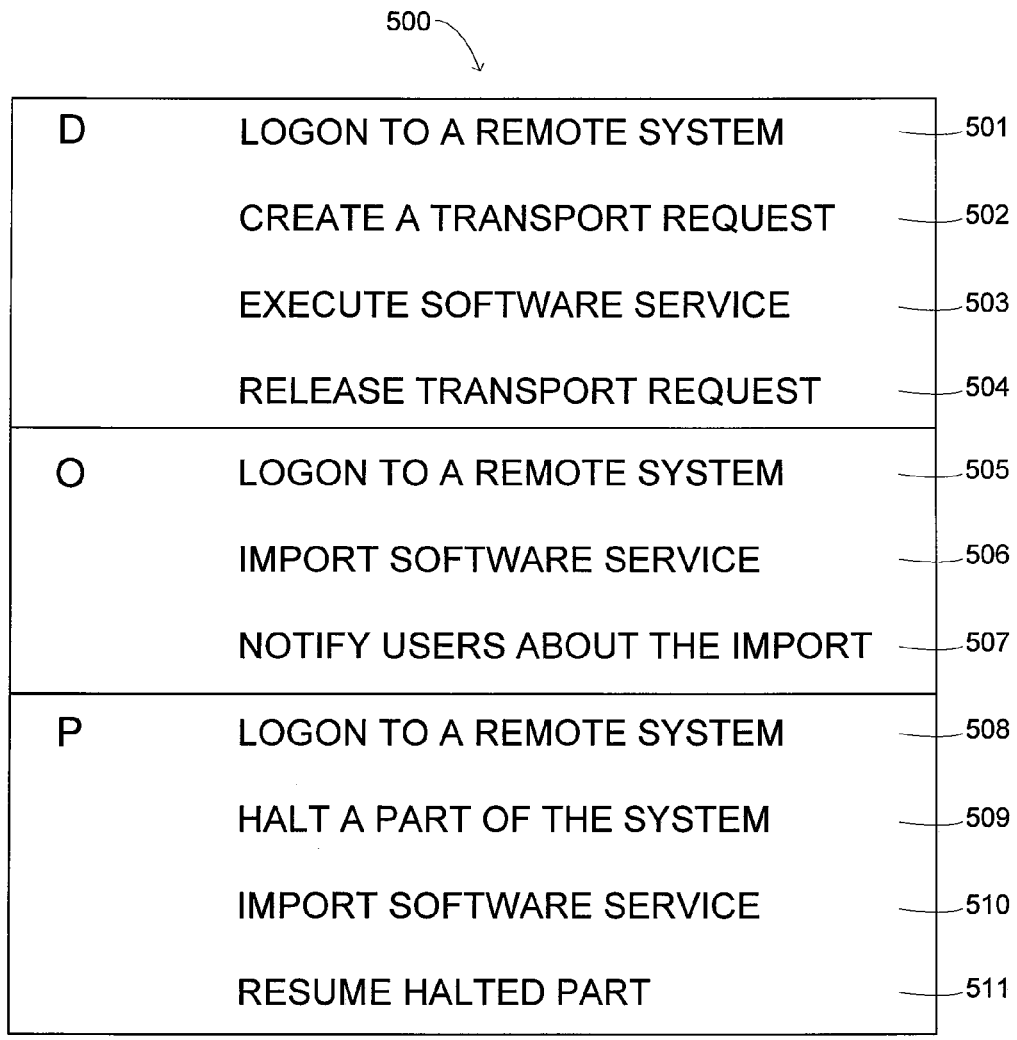
FIG. 5 illustrates a list of tasks associated to system role types.

Tasks are assigned to system role types. The tasks may be marked as compulsory and may comprise the following:

for type D:
—generate transport request with a software service
—effect the software service
—release transport request for forwarding for type O:
—import transport request
—notify quality management and await release for type P:
—import transport request
—notify quality management and await release
—generate new maintenance instance
—lock present maintenance instance
—release new maintenance instance for type R:
—inform operator In the example of FIG. 5 a list 500 contains for the system role type D a task 501 to logon to a remote system, a task 502 to create a transport request for a software service, a task 503 to execute the software service in the remote system, and a task 504 to release the transport request to the system landscape. For the system role type O the list 500 comprises a task 505 to logon to a remote system, a task 506 import a software service and a task 507 to notify the users of the system about the import. For the system role type P the list 500 comprises a task 508 to logon to a remote system, a task 509 to halt a part of the system, a task 510 to import a software service and a task 511 to resume the halted part of the system. Other and/or additional tasks as well as attributes like "compulsory" may be provided. For example, a task to collectively import software services, a task to check certain system properties, a task to check the status of a different system and, if the status indicates a first state, importing a software service, and if the status indicates a second state, not importing a software service but scheduling a new check at a different point in time, a task to check the interdependencies of software services in the buffer and to reorder them to avoid the problem illustrated by FIG. 2, etc.

Based on the transport tracks, the system role types and the list 500, a maintenance instance is automatically generated in the central system 307. The maintenance instance contains all tasks that are required for the periodic maintenance of the landscape. The tasks of a maintenance instance may be displayed, executed, managed, analyzed and documented from the central system 307 by suitable software, e.g. SAP's Schedule Manager. For that purpose, the tasks may provide spool lists, statuses, application logs, job logs etc. to the central system 307 or generate that information in the central system 307.

The maintenance instance has a hierarchical structure. The top level contains one entry per transport track. The next level contains one entry per system role type, even in case that no system of corresponding type is defined. The next level contains one entry per system role, only if this role is used by a system. The lowest level contains the tasks for each system.

Figure 6:
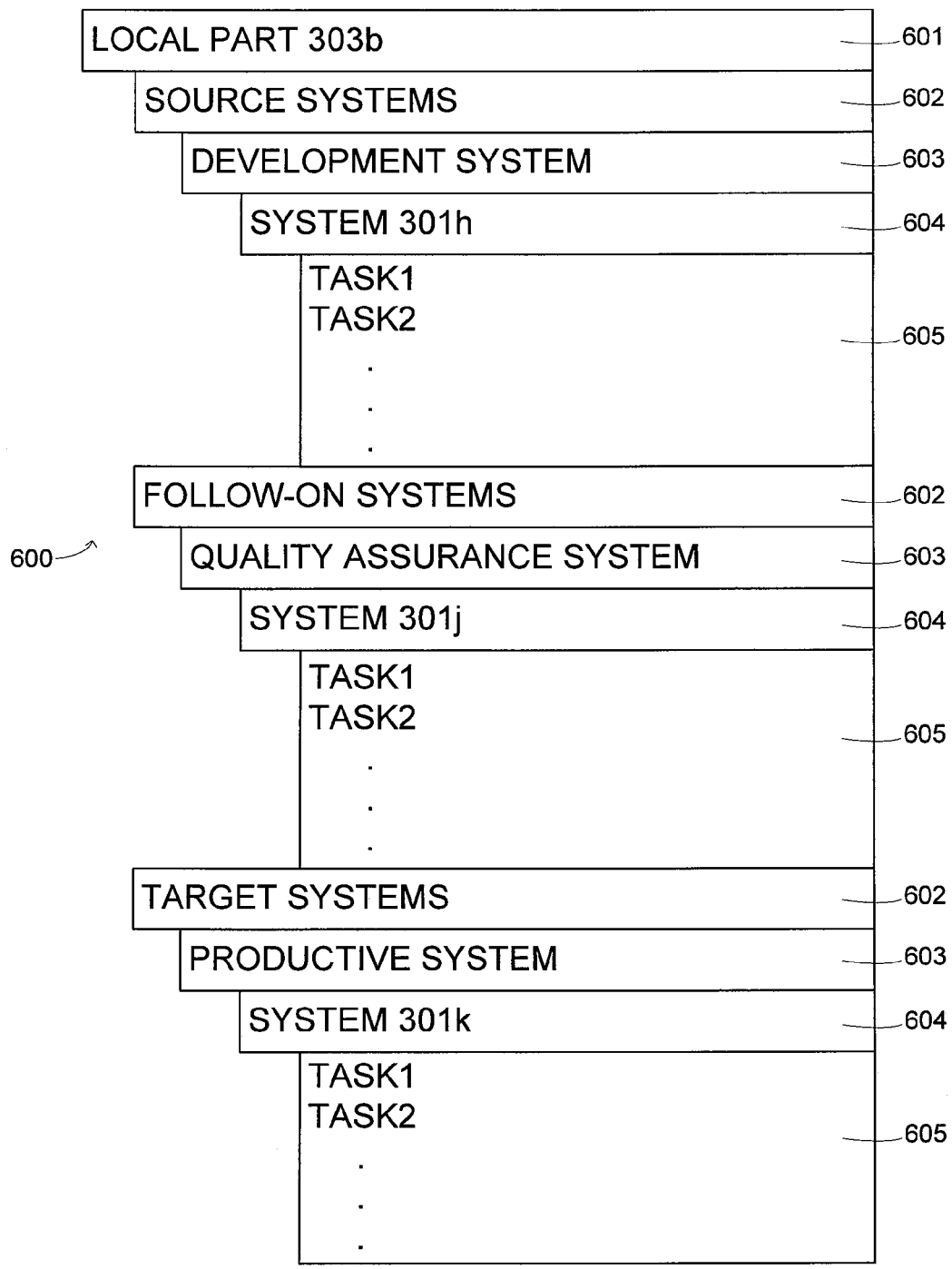
FIG. 6 illustrates a maintenance instance.

An example maintenance instance 600 is illustrated in FIG. 6 and has here a structure that is hierarchically grouped according to transport track 601, system role types 602, system roles 603, systems 604 and finally tasks 605. The tasks are associated to particular systems. The grouping allows blocking and unblocking groups of tasks. Preferably, the maintenance instance may be locked so that no further task may be performed in the locked maintenance system.

According to the method of an example embodiment of the invention, system roles and system role types are provided, the systems of the system landscape are associated to the system roles and a list of tasks is associated to system role types. At least one transport track is provided that defines a route for transport requests through a group of systems in a particular order and specifies one source system in which software services are permitted, adjacent interconnected systems, and at least one end or target system. A maintenance instance is generated from the system role types, the list and the transport tracks, the maintenance instance defining tasks for effecting a software service in a maintenance interval. This involves analyzing the transport tracks to identify the affected systems, analyzing the systems to identify their system roles, analyzing the system roles to identify their type, and compiling tasks for the affected systems according to the list. The tasks of the maintenance instance are then performed and may require authorization by the operator. The operator does not need to consider the system landscape and the transport tracks and other information to compile the tasks, but merely has to authorize steps of the maintenance instance. tasks of one level may only be executed once the tasks of the superior levels are released. At the end of the maintenance instance, when all tasks have been performed, e.g. all systems of the transport track have been serviced, the maintenance instance is locked and a new maintenance instance is generated and released for execution at the next maintenance interval.

Although the foregoing has been a description of an example embodiment of the invention, it will be apparent to those skilled in the art upon review of this disclosure that numerous variations and modifications may be made in the invention. For example, instead of using SAP R/3 Release 4.5, other SAP and non-SAP systems may benefit from the invention.

What is claimed is:

1. A method for effecting software maintenance in a software system landscape comprising a central control system and a plurality of logical systems interconnected by logical transport paths, each logical system having associated therewith one of a plurality of system roles, the method comprising:

providing system role types, each of the system role types comprising a group of system roles;

providing an association of tasks to the system role types;

providing a transport track, the transport track defining a route for software services through a group of systems in a particular order and specifying one source system in which software services are permitted, adjacent interconnected systems, and at least one target system, each of the software services relating to at least one of a computer code and associated data of at least one system in the landscape;

generating automatically a maintenance instance in the central system from the system role types, the association and the transport tracks, the maintenance instance defining tasks for effecting a periodic software service in a maintenance interval, generating the maintenance instance involves analyzing the transport tracks to identify affected systems, analyzing the systems to identify their system roles, analyzing the system roles to identify their type, and compiling required tasks for the affected systems according to a list which contains different mapped tasks for the different system role types of each system on the transport track; and carrying out the tasks in the respective affected system after logon to the system.

2. The method of claim 1, wherein the maintenance instance is generated with hierarchy levels.

3. The method of claim 2, wherein the hierarchy levels are generated to include a transport track level, a system role type level below the transport track level, a system role level below the system role type level, a system level below the system role level and a task level below the system level.

4. The method of claim 1, wherein as a system role type one of the group of source system, follow-on system, target system or postprocessing system is used.

5. The method of claim 1, wherein the maintenance instance is locked when it is completed and a new maintenance instance is generated.

6. The method of claim 1, wherein the tasks in the respective system are executed from the central system.

7. A computer system comprising:

a central control system;

a plurality of logical systems, each logical system having associated therewith one of a plurality of system roles;

logical transport paths that interconnect the logical systems to form a software system landscape;

a transport track that defines a route for software services through a group of systems in a particular order and specifies one source system in which software services are permitted, adjacent interconnected systems, and at least one target system, each software service relating to at least one of a computer code and associated data of at least one system in the landscape;

system role types, each system role being of a system role type;

an association of tasks to system role types; and a maintenance instance to be automatically generated from the system role types, the association and the transport tracks, the maintenance instance defining tasks for effecting a periodic software service in a maintenance interval, the maintenance instance further to involve analyzing the transport tracks to identify affected systems, analyzing the systems to identify their system roles, analyzing the system roles to identify their type, and compiling required tasks for the affected systems according to a list which contains different mapped tasks for the different system role types of each system on the transport track, and carrying out the tasks in the respective affected system after logon to the system.

8. The system of claim 7, wherein the maintenance instance comprises hierarchy levels.

9. The system of claim 8, wherein the hierarchy levels include a transport track level, a system role type level below the transport track level, a system role level below the system role type level, a system level below the system role level and a task level below the system level.

10. The system of claim 7, wherein the system role types comprise one of the group of source system, follow-on system, target system or postprocessing system.

11. The system of claim 7, wherein the tasks in the respective system are executable from the central system.

12. A computer-readable storage medium storing instructions that, upon execution on a computer system, causes the computer to perform a method for effecting software maintenance in a software system landscape comprising a central control system and a plurality of logical systems interconnected by logical transport paths, each logical system having associated therewith one of a plurality of system roles, the method comprising:

providing system role types, each of the system role types comprising a group of system roles;

providing an association of tasks to the system role types;

providing a transport track, the transport track defining a route for software services through a group of systems in a particular order and specifying one source system in which software services are permitted, adjacent interconnected systems, and at least one target system, each of the software services relating to at least one of a computer code and associated data of at least one system in the landscape;

generating automatically a maintenance instance in the central system from the system role types, the association and the transport tracks, the maintenance instance defining tasks for effecting a periodic software service in a maintenance interval, generating the maintenance instance involves analyzing the transport tracks to identify the affected systems, analyzing the systems to identify their system roles, analyzing the system roles to identify their type, and compiling required tasks for the affected systems according to a list which contains different mapped tasks for the different system role types of each system on the transport track; and carrying out the tasks in the respective affected system after logon to the system.

\* \* \* \* \*